Feb. 23, 1937.  F. A. B. COSSENTINE  2,072,066
TOGGLE BOLT
Filed Oct. 28, 1936
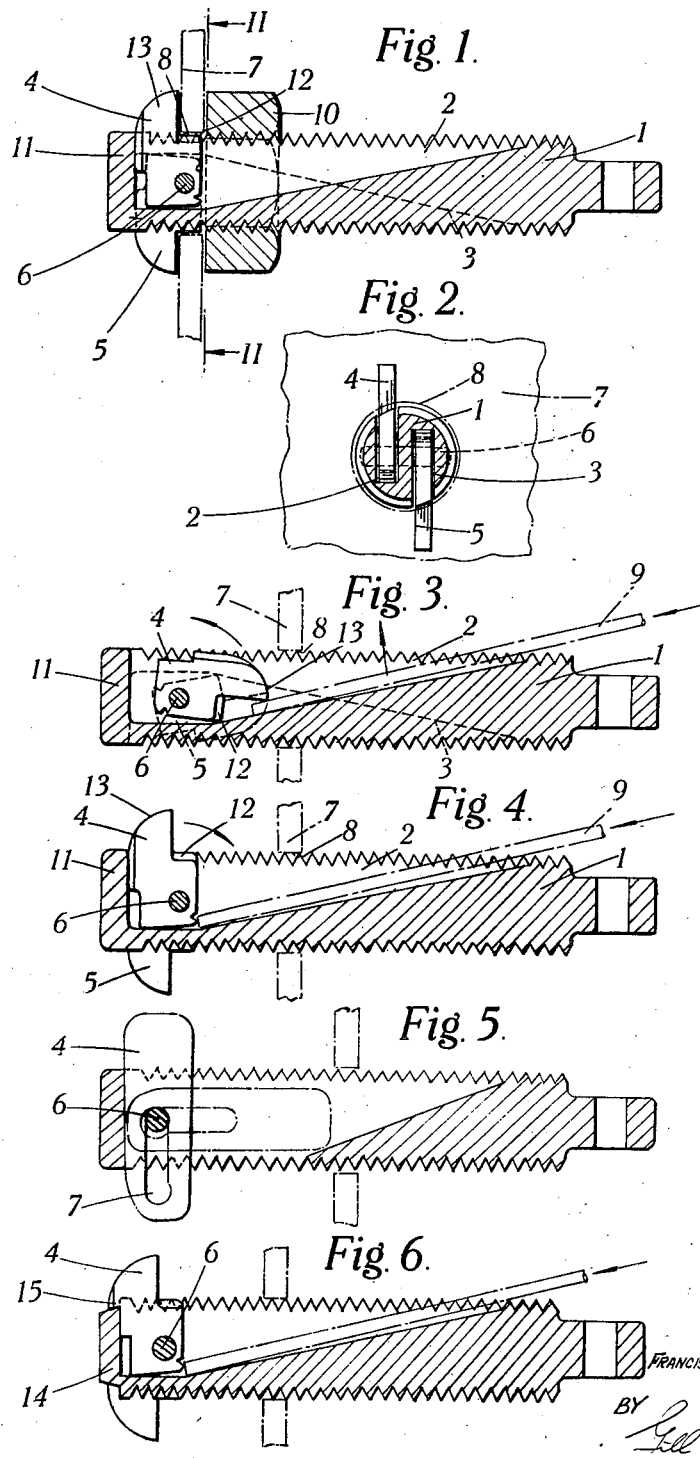
INVENTOR
FRANCIS ALBERT BRICE COSSENTINE
BY
Gill Jennings
ATTORNEYS Patented Feb. 23, 1937

2,072,066

UNITED STATES PATENT OFFICE 2,072,066

TOGGLE BOLT

Francis Albert Brice Cossentine, Tolworth, England

Application October 28, 1936, Serial No. 108,016
In Great Britain May 29, 1935

9 Claims. (Cl. 85—3)

This invention relates to screws, bolts and studs.

Difficulty is very frequently experienced where a screw, a bolt or a stud (referred to generally in what follows as studs) is to be passed through and securely fixed to a part or member, the rear surface of which is inaccessible. This is especially the case where the part that has to be traversed is so thin that it cannot be adequately screw-threaded. Various attempts have been made to devise screws, bolts and studs which will obviate this difficulty but most of them suffer from one or more of various disadvantages. In many cases the proposed arrangement involves the making of a hole which is substantially larger than is necessary to accommodate the shank of the stud thus leading to local weakening; in other cases the article was such that, although it could be placed in position, it could not or could only with difficulty be removed; in other cases the article was so expensive to manufacture that it could have no hope of commercial success. The object of the invention is to devise a form of stud in which these disadvantages are not present.

According to the invention, a stud is provided with one or more arms or the like which can be caused to take up a retracted position in which the stud can be passed through a hole having a diameter not substantially greater than its own, the arm or arms being so arranged that when the stud is so passed through such a hole, it or they can be caused to take up an open position to prevent removal of the stud but can still be acted upon positively by means not permanently connected thereto from the side from which the stud was inserted and thus be brought back into the retracted position in which the stud can be withdrawn.

In the preferred form of the invention the stud is provided with two arms and a pair of parallel slots which extend to near one end of it. These slots are parallel to each other and extend from opposite sides of the stud so as to overlap. The arms are mounted one in each slot on a common pin passing through these two slots and are arranged so that they can be turned about this pin so as to lie wholly within the slots or so as to project at right angles from the slots and bear against the blind ends of the latter. When such a stud is to be used, the arms are put in the position in which they are within their slots and the end of the stud is passed through the hole. The slots are of such a length that the front end is still accessible from the side from which the stud was inserted and a pin is inserted into each slot in turn and used as a pick to bring the arms into their open position. The stud can then be fixed by means of a nut. When it is desired to remove the stud, the nut is slackened off or removed, the stud pushed further through the hole and the pin is again inserted in each of the slots in turn and is caused to press on the part of the arms beneath the pivot pin so that they are turned into their retracted position within the slot. The stud can then be easily removed.

In order that the invention may be properly understood and be more readily carried into effect, examples of construction in accordance therewith will now be described with reference to the accompanying drawing, in which:—

Figure 1 is a sectional elevation showing one form of stud in accordance with the invention fixed to a thin plate.

Figure 2 is a cross section on the line II—II in Figure 1.

Figure 3 illustrates the method of procedure of putting the stud into position.

Figure 4 illustrates the method of procedure of withdrawing the stud.

Figures 5 and 6 are sectional elevations of two further forms of stud.

The stud 1 shown in Figures 1 to 4 of the drawing is provided with a pair of slots 2, 3 which are capable of housing arms 4 and 5 respectively. The two slots are parallel to each other and overlap, as seen clearly in Figures 1 and 2, and the two arms are mounted in these slots on a common pin 6. When it is desired to fix such a stud to a thin plate, such as is shown at 7 and which has a hole 8 the diameter of which is not substantially greater than that of the stud, the arms of the stud are first of all placed in their retracted positions as shown in Figure 3 so that they do not project beyond the surface of the stud. The stud can then be pushed through the hole 8 from the right. When it is in the position shown in Figure 3, a pin 9 is slid along the base of each of the slots in turn and each of the arms is thus swung about the pivot pin 6 so as to occupy the positions shown in Figure 1. The stud is preferably turned so that each of the arms lies in a horizontal plane while this is being done. A nut 10 can then be screwed on to the stud which is then securely fixed to the plate 7. It will be noted that the arms 4 are stepped at 12 so that even if the pins 6 were to shear or to fall out, the arms 4 and 5 would still remain in position and not fall out of the slots. It will also be seen that the outer edges of the arms 4 and 5 bear against the end walls 11 of the slots 2 and 3 and that the lower left hand and upper right hand corners respectively of the two arms bear against the bottom of the slots and also that there is a third abutment at the steps 12. Thus, the pivot pin 6 is not subjected to an undue shearing stress when the nut 10 is tightened.

When it is desired to remove the stud, the nut 10 is removed or slackened off, the stud pushed further through into the position of Figure 3 and the pin 9 is again inserted into each of the slots in turn so as to press this time on the part of the arms below the pin 6 as shown in Figure 4. A nick is provided in each arm as shown at 13 to receive the end of the pin 9 so as to assist in this operation. This causes the arms to turn clockwise and to re-assume the position shown in Figure 2. It will be seen that the outer edges of the arms 4 and 5 are curved. This ensures that the arms will not engage the edge of the hole 8 when the stud is withdrawn if the arms are not fully in the retracted position. If the latter is the case, the curved portion acts as a cam whereby the edge of the hole 8 returns the arms into the fully retracted positions.

It is convenient to provide the free end of the stud, that is the right hand end in Figure 1, with a transverse hole for the reception of a piece of wire or a tommy bar, by means of which the stud can be held stationary while the nut is being done up. The portion of the stud in which this transverse hole is provided is conveniently reduced as shown so that a wire can be passed through the transverse hole and then bent back on each side so that a nut can be passed over the end of the stud when the wire is in this bent back position. It is often convenient for this to be possible. Other arrangements are, however, possible. For example, the end face of the stud could have a screw driver slot cut in it or the end could be provided with a square or hexagonal head.

Although the stud of Figures 1 to 4 is shown with two arms, it is to be understood that only one arm could be employed although, of course, two arms will usually be preferable so as to avoid any substantial one-sided pull on the stud. In the case of large studs, three or even more arms could be provided and the slots accommodating them could then be arranged radially, in which case, of course, a separate pin would be provided for each arm.

For convenience of manufacture, the slots 2 and 3 may be made open at the rear end and then be closed by means of an added part. This, however, leads to a form of construction which is not as strong as that illustrated.

In the arrangement of Figure 5, a single arm 4 is provided which, however, projects on both sides of the stud. It is mounted on a pin 6 which passes through a slot 7 in the arm 4. The arm 4 is retracted by raising the arm vertically until the pin 6 is at the end of the slot 7 and then canting the arm 4 slightly to the right which is possible by reason of the fact that the lower left hand corner of the arm 4 is appropriately curved and the right hand bottom portion of the slot 7 is enlarged as shown. This retraction is, of course, effected by hand before the stud is passed through the hole in the plate and by a pin, when the stud is to be removed, in the same manner as already described with reference to the example of Figures 1 to 4. The retracted position of the single arm 4 is shown in dotted lines.

The arrangement of Figure 6 is similar to that of Figures 1 to 4 except that here the abutment between the arm 4 and the end 14 of the stud 5 takes place at an undercut surface 15 on the arm 4, the end 14 of the stud being cut down or slotted to allow of this.

The pins on which the arms are mounted are preferably made of hardened steel. On the other hand, they must not be brittle and the most appropriate pin to be used is one such as normally used in power transmission chains. Similarly, the arms 4 and 5 are preferably made of hardened steel. It is of advantage to make these arms of a material which is harder than that of the part to which the stud is to be attached because they will tend to dig slightly into the rear surface of this part when the nut 10 is tightened and counteract any tendency of the stud to rotate. If necessary, the arms may be provided with a knurled surface.

Springs may be provided in the slots which tend to keep the arms in one or the other of their two positions but, generally speaking, this is not desirable because in the first place, it adds to the complication of the device both from the point of view of manufacture and from the user's point of view.

In the drawing, the stud has been shown mounted on a plate. It is particularly suitable for being mounted on a tube, a tube of small diameter being a good example of a part having only one accessible surface. Studs frequently have to be mounted on such tubes in motor car repair work, for example, for fixing parts to the tubular members of windscreen frames and the like.

Studs according to the invention may be employed for stopping leaks in water, petrol or oil tanks or the like. For this purpose, the left hand end of the stud is provided with a tapered or bolt-shaped nose which can be serrated and by means of which the end of the stud can be forced through thin metal which has become porous. When the studs are employed in this way, the slots are packed with white lead or other packing after the stud is in position and a nut of sufficient length to completely cover the slots is employed so as to obviate any leakage.

The studs according to the invention may be employed, as will be seen, even in a reamered or similarly close fitting hole.

It is to be understood that the claims are not limited to the constructions shown in the drawing since clearly modifications may be made and, therefore, the claims are intended to be construed to cover all such modifications as their language will allow in the light of the prior art.

The term "stud" when used in the following claims is to be understood as including a bolt or screw.

I claim:

1. A substantially solid stud of the character described comprising an exteriorly threaded body portion having a slot at one side and at least one movable arm at its inner end, means connecting said arm to the stud to allow said arm to take up a position whereby the stud can be passed through a hole of a diameter substantially equal to its own, thence to another position in which said arm projects from the stud at substantially right angles, said slot extending outwardly for a major portion of the length of the stud and towards its other end whereby said arm may be acted upon positively by extraneous means through said slot to move said arm into the first of said positions from a point remote from said arm.

2. A substantially solid stud of the character described comprising an exteriorly threaded body portion and having a slot near one end and a movable arm disposed in said slot, means connecting said arm to the stud to allow said arm to take up a position in said slot whereby the stud can be passed through a member having a hole of a diameter substantially equal to its own, thence to another position in which said arm projects from said stud at substantially right angles, said slot extending out through one side of said stud towards the other end to a point remote from said arm to allow the passage of an extraneous member for acting positively on said arm to move said arm into the first of said positions when it is desired to withdraw said stud.

3. A stud of the character set forth comprising a body portion provided with two parallel overlapping slots in opposite sides of the body portion and having a movable arm disposed in each of said slots, means connecting each of said arms to the stud to allow said arm to take up a position entirely in its slot whereby the stud can be passed through a hole of a diameter substantially equal to its own, thence to another position in which it projects from said stud at substantially right angles, each of said slots extending to a point remote from said arm to allow the passage of an extraneous member for acting positively on said arm to move said arm into the first of said positions when it is desired to withdraw said stud.

4. A stud of the character set forth comprising a body portion provided with two parallel overlapping slots in opposite sides of the body portion and having a movable arm disposed in each of said slots, means connecting each of said arms to the stud to allow said arm to take up a position entirely in its slot whereby the stud can be passed through a hole of a diameter substantially equal to its own, thence to another position in which it projects from said stud at substantially right angles, said connecting means comprising a single pivot pin passing through said two slots, each of said slots extending to a point remote from said arm to allow the passage of an extraneous member for acting positively on said arm to move said arm into the first of said positions when it is desired to withdraw said stud.

5. A substantially solid stud of the character set forth comprising a body portion provided with at least one slot and having a movable arm disposed in said slot, pivot means connecting said arm directly to the stud to allow said arm to take up a position in said slot whereby the stud can be passed through a member having a hole of a diameter substantially equal to its own, thence to another position in which said arm projects from said stud at substantially right angles, said slot extending outwardly for a major portion of the length of the stud to a point remote from said arm to allow the passage of an extraneous member for acting positively on said arm to move said arm into the first of said positions to permit withdrawal, and an abutment for said arm on the stud resisting the force exerted on the projecting arm consequent on a tendency to withdrawal of said stud from a hole through which it has been passed.

6. A stud of the character set forth comprising a body portion provided with at least one slot and having a movable arm disposed in said slot, means connecting said arm to the stud to allow said arm to take up a position entirely within said slot whereby the stud can be passed through a member having a hole of a diameter substantially equal to its own, thence to another position in which said arm projects from said stud at substantially right angles, said slot extending to a point remote from said arm and to allow the passage of an extraneous member for acting positively on said arm to move said arm into the first of said positions to permit withdrawal, and means on said arm cooperating with the member having the hole through which the stud has been passed for engaging the walls of said hole to prevent any lateral movement of the arm relative to the stud thereby to prevent loss of the stud if said connecting means fails.

7. A stud of the character set forth comprising a body portion provided with at least one slot near one end and having an L-shaped movable arm disposed in said slot, means pivotally connecting said arm to the stud to allow said arm to take up a position in its slot whereby the stud can be passed through a member having a hole of a diameter substantially equal to its own, thence to another position in which said arm projects from said stud at substantially right angles to engage the inner surface of the member and the wall of said hole, said slot extending to a point remote from said arm towards the other end to allow the passage of an extraneous implement outside of said member for acting positively on said arm to move said arm into the first of said positions.

8. An exteriorly threaded stud of the character set forth comprising a body portion provided with at least one slot and having a movable arm disposed in said slot near one end, means pivotally connecting said arm to the stud to allow said arm to take up a position in its slot such that the stud can be passed through a member having a hole of a diameter not substantially greater than its own, thence to another position in which said arm projects from said stud at right angles to engage the inner surface of said member, said slot extending outwardly and towards the other end to a point remote from said arm to allow the insertion of an extraneous member for positively acting on the part of said arm which lies within said slot beneath said pivot means to turn said arm from said projecting position into a position in which it lies wholly within said slot when withdrawal is desired.

9. A substantially solid exteriorly threaded stud of the character set forth comprising a body portion slotted at one end and having a movable arm mounted in said slot to take up a position such that the stud can be passed through a hole of a diameter not substantially greater than its own, thence to another position in which said arm projects from said stud at substantially right angles, said arm being of such form that it can be brought into said projecting position by turning said stud to allow gravity to act on said arm, said slot being of such length as to permit extraneous means to act positively upon the arm from a point remote from said arm to move it into the first of said positions when withdrawal is desired.

FRANCIS ALBERT BRICE COSSENTINE.